US011861481B2

(12) United States Patent
Guo et al.

(10) Patent No.: US 11,861,481 B2
(45) Date of Patent: Jan. 2, 2024

(54) SEARCHING AN AUTONOMOUS VEHICLE SENSOR DATA REPOSITORY

(71) Applicant: Waymo LLC, Mountain View, CA (US)

(72) Inventors: Zijian Guo, Sunnyvale, CA (US); Nichola Abdo, Mountain View, CA (US); Junhua Mao, Palo Alto, CA (US); Congcong Li, Cupertino, CA (US); Edward Stephen Walker, Jr., San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 573 days.

(21) Appl. No.: 16/726,060

(22) Filed: Dec. 23, 2019

(65) Prior Publication Data
US 2020/0202196 A1    Jun. 25, 2020

Related U.S. Application Data

(60) Provisional application No. 62/784,354, filed on Dec. 21, 2018.

(51) Int. Cl.
*G06F 16/53* (2019.01)
*G06N 3/042* (2023.01)
(Continued)

(52) U.S. Cl.
CPC ........... *G06N 3/042* (2023.01); *G05D 1/0088* (2013.01); *G05D 1/0221* (2013.01);
(Continued)

(58) Field of Classification Search
CPC ...... G06N 3/0427; G06N 3/0454; G06N 3/08; G06F 16/538; G06F 16/535; G05D 1/0088; G05D 1/0221; G05D 2201/0213
See application file for complete search history.

(56) References Cited

U.S. PATENT DOCUMENTS 8,918,416 B1  12/2014  Gross et al.
9,990,687 B1   6/2018  Kaufhold et al.
(Continued)

FOREIGN PATENT DOCUMENTS

CN    107924402    4/2018
CN    108701140   10/2018
(Continued)

OTHER PUBLICATIONS

Hallac et al., "Drive2Vec: Multiscale State-Space Embedding of Vehicular Sensor Data", Dec. 10, 2018, IEEE (Year: 2018).*
(Continued)

*Primary Examiner* — Hosain T Alam
*Assistant Examiner* — Robert F May
(74) *Attorney, Agent, or Firm* — Fish & Richardson P.C.

(57) ABSTRACT

Methods, systems, and apparatus, including computer programs encoded on computer storage media, for searching an autonomous vehicle sensor data repository. One of the methods includes maintaining a collection of sensor samples and, for each sensor sample, an embedding of the sensor sample; receiving a request specifying a query sensor sample, wherein the query sensor sample characterizes a query environment region; and identifying, from the collection of sensor samples, a plurality of relevant sensor samples that characterize similar environment regions to the query environment region, comprising: processing the query sensor sample through the embedding neural network to generate a query embedding; and identifying, from sensor samples in a subset of the sensor samples in the collection, a plurality of sensor samples that have embeddings that are closest to the query embedding.

17 Claims, 3 Drawing Sheets

(51) Int. Cl.
  G06F 16/538    (2019.01)
  G06F 16/535    (2019.01)
  G05D 1/00      (2006.01)
  G05D 1/02      (2020.01)
  G06N 3/08      (2023.01)
  G06N 3/045     (2023.01)

(52) U.S. Cl.
  CPC .......... *G06F 16/535* (2019.01); *G06F 16/538* (2019.01); *G06N 3/045* (2023.01); *G06N 3/08* (2013.01); *G05D 2201/0213* (2013.01)

(56) References Cited

U.S. PATENT DOCUMENTS

| | | | |
|---|---|---|---|
| 10,111,043 | B1* | 10/2018 | Cirit ................ G06Q 10/08 |
| 2011/0242342 | A1* | 10/2011 | Goma ............... H04N 23/665 |
| | | | 348/E5.024 |
| 2017/0249515 | A1 | 8/2017 | Bai |
| 2018/0012082 | A1* | 1/2018 | Satazoda ............ G06V 10/763 |
| 2018/0173971 | A1 | 6/2018 | Jia et al. |
| 2018/0285730 | A1 | 10/2018 | Zhao et al. |
| 2019/0129436 | A1* | 5/2019 | Sun ...................... G06N 3/08 |
| 2019/0156134 | A1* | 5/2019 | Krishnan .............. G06N 5/04 |
| 2020/0176121 | A1* | 6/2020 | Dalal ................... G16H 20/60 |

FOREIGN PATENT DOCUMENTS

| | | |
|---|---|---|
| JP | 2012234395 | 11/2012 |
| JP | 2017539023 | 12/2017 |
| JP | 2018128456 | 8/2018 |
| JP | 2018173946 | 11/2018 |
| WO | WO 2017/201444 | 11/2017 |
| WO | WO 2018/154100 | 8/2018 |

OTHER PUBLICATIONS

Zhou et al., "End-to-End Multi-View Fusion for 3D Object Detection in LiDAR Point Clouds," https://arxiv.org/abs/1910.06528v2, Oct. 2019, 10 pages.
Zhou et al., "VoxelNet: End-to-End Learning for Point Cloud Based 3D Object Detection," 2018 IEEE/CVF Conference on Computer Vision and Pattern Recognition, Jun. 2018, 4490-4499.
PCT International Search Report and Written Opinion in International Appln. No. PCT/US2019/068431, dated Apr. 24, 2020, 14 pages.
PCT International Preliminary Report on Patentability in International Appln. No. PCT/US2019/068431, dated Jul. 1, 2021, 9 pages.
Office Action in Japanese Appln. No. 2021-533733, dated Jun. 24, 2022, 15 pages (with English translation).
Decision to Grant a Patent in Japanese Appln. No. 2021-533733, dated Dec. 21, 2022, 5 pages (with English translation).
Office Action in Chinese Appln. No. 201980084969.2, dated Jul. 25, 2023, 20 pages (with English translation).
Arandjelovic et al., "NetVLAD: CNN Architecture for Weakly Supervised Place Recognition," 2016 IEEE Conference on Computer Vision and Pattern Recognition, Jun. 27, 2016, pp. 5297-5307.
Insightdatascience.com [online], "The unreasonable effectiveness of Deep Learning Representations: Building an image search service from scratch," Jul. 5, 2018, retrieved retrieved from URL<https://web.archive.org/web/20180705160212/https://blog.insightdatascience.com/the-unreasonable-effectiveness-of-deep-learning-representations-4ce83fc663cf>, 23 pages.
Office Action in European Appln. No. 19845658.4, dated Aug. 30, 2023, 10 pages.
Wikipedia, "Convolution Neural Network", downloaded from the Internet Archive Wayback Machine's archive dated Nov. 13, 2018 with URL: https://web.archive.org/web/20181113021253/https://en.wikipedia.org/wiki/Convolutional_neural_network.†
Vikram Singh, "Convolutional Neural Networks for Image Classification", downloaded from the Internet Archive Wayback Machine's archive dated Jan. 21, 2018 with URL: https://web.archive.org/web/20180121184329/https://www.completegate.com/2017022864/blog/deep-machine-learning-images-lenet-alexnet-cnn/all-pages.†
William Koehrsen, "Neural Network Embeddings Explained", downloaded from the Internet Archive Wayback Machine's archive dated Oct. 3, 2018 with URL: https://web.archive.org/web/20181003105022/https://towardsdatascience.com/neural-network-embeddings-explained-4d028e6f0526.†

\* cited by examiner
† cited by third party

SEARCHING AN AUTONOMOUS VEHICLE SENSOR DATA REPOSITORY

CROSS-REFERENCE TO RELATED APPLICATION

This application claims priority to U.S. Provisional Application No. 62/784,354, filed on Dec. 21, 2018. The disclosure of the prior application is considered part of and is incorporated by reference in the disclosure of this application.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values. Once a neural network is trained, the final set of parameter values can be used to make predictions in a production system.

SUMMARY

This specification describes how a computer system can use embeddings to effectively search a repository of sensor data collected from autonomous vehicles.

An embedding, as used in this specification, is a numeric representation of a group of sensor data that characterizes an environment region. In particular, an embedding is a numeric representation in an embedding space, i.e., an ordered collection of a fixed number of numeric values, where the number of numeric values is equal to the dimensionality of the embedding space. For example, the embedding can be a vector of floating point or other type of numeric values. Generally, the dimensionality of the embedding space is much smaller than the number of numeric values in the group of sensor data represented by a given embedding.

Particular embodiments of the subject matter described in this specification can be implemented so as to realize one or more of the following advantages.

Autonomous or semi-autonomous vehicles have sensors that collect data about the environment surrounding the vehicle as the vehicle drives through the environment. The data collected by these sensors over many driving hours and by many different autonomous vehicles can be stored in a repository for later use, e.g., for playback to users that analyze events encountered by vehicles driving through an environment or for use in training machine learning models to make various predictions that may be relevant to the operation of the autonomous vehicle. For example, stored data can be used to train a machine learning model that classifies objects of a particular type.

However, effectively making use of the stored data is difficult due to the large amount of sensor data that is collected and stored. In particular, once a particular sensor sample is identified as characterizing a region of interest, i.e., a region where an event of interest is occurring or a particular object of interest is located, given the large amount of experience collected by a fleet of autonomous vehicles it is likely that other similar events or objects have been previously encountered by one of the autonomous vehicles in the fleet. Thus, the sensor data repository likely stores sensor samples characterizing similar regions.

However, searching the repository for these similar samples is challenging for at least two reasons: (1) the sensor samples are high-dimensional data and therefore searching through a large number of samples consumes a very large amount of computational resources and (2) because of the high-dimensionality of the sensor samples, identifying which samples characterize similar regions as the query sample is difficult to determine.

In particular, in some cases, the repository may associate labels with some or all of the samples in the repository to make searching the repository easier. Then, when a sensor sample is identified, the system can search the repository to surface the other samples that have been associated with the same label as the identified sensor sample. However, when the identified sensor sample does not match any of the labels, e.g., when the sensor sample characterizes a new type of object that was not previously of interest or a new kind of event that was not previously of interest, or when the label for the identified sensor sample is noisy, e.g., when the system cannot reliably identify which type of object the sensor sample characterizes, searching using the labels is ineffective.

The described techniques, on the other hand, allow the sensor data repository to be effectively searched without consuming an excessive amount of computational resources and even if the query sensor sample doesn't match any of the pre-existing labels. In particular, by searching using embeddings, the system can search through data that is much lower dimensionality. Additionally, because the embeddings represent desirable characteristics of the corresponding sensor samples, similar sensor samples can be effectively identified by searching using embeddings.

Moreover, the system can generate multiple different embeddings for each sensor sample that each reflect different characteristics or properties of the sensor sample. This can allow the system to surface embeddings that have are similar with respect to different characteristics. Alternatively, by searching for sensor samples for which all of the corresponding embeddings are close to the corresponding embeddings for the identified sample, the system can more effectively surface the most similar sensor samples.

Additionally, the system can use a variety of indexing techniques, e.g., slicing a search engine index, to further optimize the search process and to allow the system to decrease latency and computational resource consumption even further than the already significant decrease achieved by searching using embeddings.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a training system can use embeddings to effectively search a sensor data repository.

Figure 1:
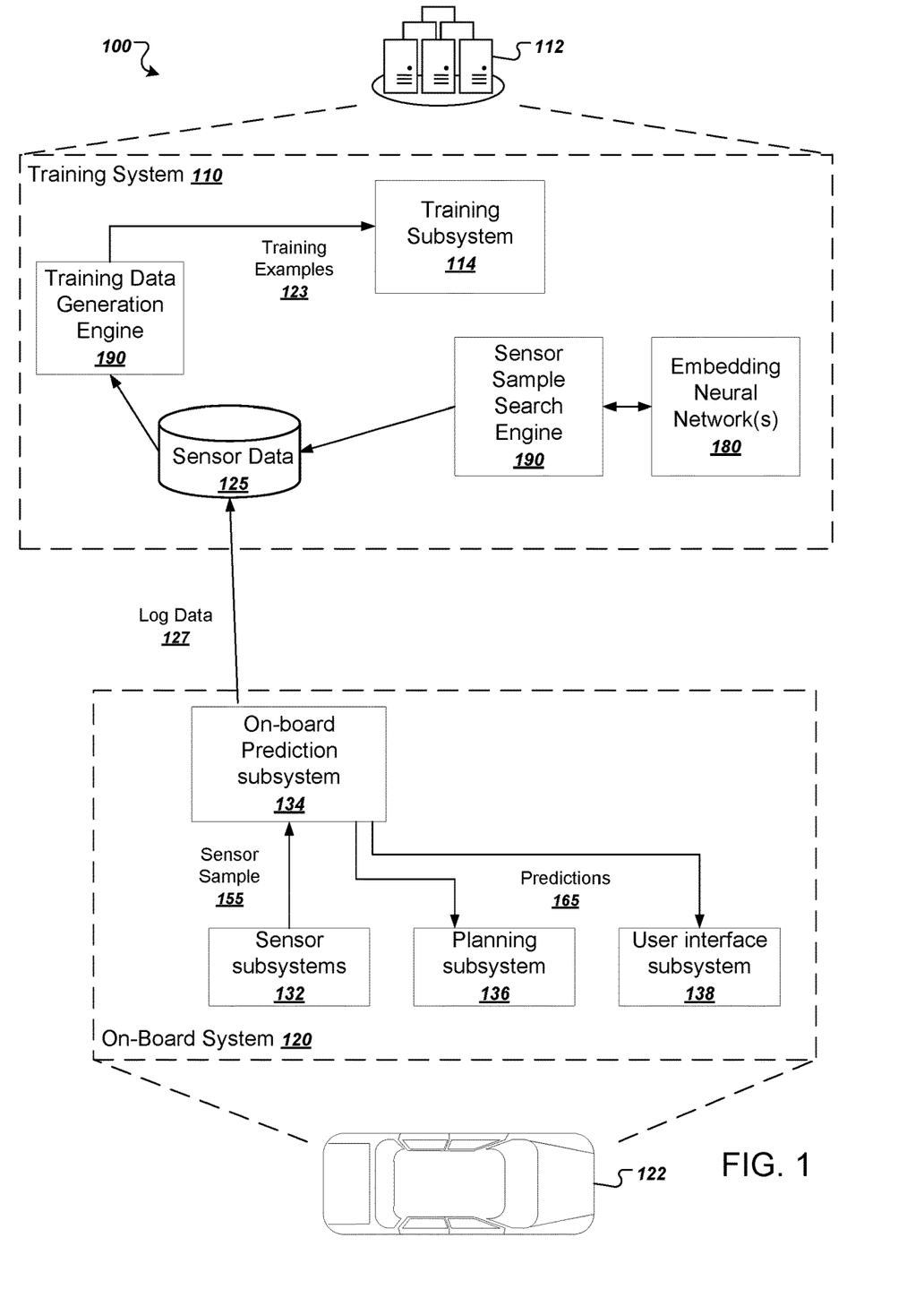
FIG. 1 is a diagram of an example system.

FIG. 1 is a diagram of an example system 100. The system 100 includes a training system 110 and an on-board system 120.

The on-board system 120 is physically located on-board a vehicle 122. The vehicle 122 in FIG. 1 is illustrated as an automobile, but the on-board system 120 can be located on-board any appropriate vehicle type. The vehicle 122 can be a fully autonomous vehicle that determines and executes fully-autonomous driving decisions in order to navigate through an environment. The vehicle 122 can also be a semi-autonomous vehicle that uses predictions to aid a human driver. For example, the vehicle 122 can autonomously apply the brakes if a prediction indicates that a human driver is about to collide with another vehicle.

The on-board system 120 includes one or more sensor subsystems 132. The sensor subsystems 132 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 132 or other components of the vehicle 122 can also combine groups of one or more raw sensor measurements from one or more sensors as being measures of the same region in the environment. A group of sensor measurements can be represented in any of a variety of ways, depending on the kinds of sensor measurements that are being captured. Each group of raw laser sensor measurements, for example, can be represented as a three-dimensional point cloud, with each point having an intensity and a position. In some implementations, the position is represented as a range and elevation pair. Each group of camera sensor measurements can be represented as an image patch, e.g., an RGB image patch.

Once a group of one or more raw sensor measurements has been classified as being a measure of a particular region in the environment, the sensor subsystems 132 or the other components of the vehicle 122 generate a sensor sample 155 from the sensor measurements that measure the vehicle. For example, the sensor sample can include one or more of: a patch of an image captured by the camera sensor of the region of the environment, point cloud data generated by one or more of the laser sensors that corresponds to the region of the environment, or portions of one or more projections, e.g., a projection from a top-down view or a perspective view, of sensor data captured by one or more of the laser sensors that correspond to the region of the environment.

The sensor subsystems 132 or the other components provide the sensor sample 155 to an on-board prediction subsystem 134. The on-board prediction subsystem 134 uses some or all of the data in the sensor sample 155 to generate one or more predictions 165. For example, the on-board prediction subsystem 134 can implement one or more machine learning models that each use the sensor sample 155 to make a prediction that is relevant to the operation of the vehicle 122. As a particular example, one or more machine learning models can be classification machine learning models that classify an object located in the region characterized by the sensor sample. As another particular example, one or more machine learning models can be behavior prediction machine learning models that predict a future trajectory of the object located in the region characterized by the sensor sample.

The on-board classifier subsystem 134 can provide the predictions 165 to a planning subsystem 136, a user interface subsystem 138, or both.

When a planning subsystem 136 receives the predictions 165, the planning subsystem 136 can use the predictions 165 to make fully-autonomous or semi-autonomous driving decisions. For example, if the predictions include a prediction indicating that a particular type of traffic sign is in the vicinity of the vehicle, the planning subsystem 136 can generate a fully-autonomous plan to adjust the trajectory of the vehicle 122 to conform to the requirements of the traffic sign, e.g., to apply the brakes when the traffic sign is a yield sign. As another example, the planning subsystem 136 can generate a semi-autonomous recommendation for a human driver to apply the brakes in order to conform with the requirements of the traffic sign.

A user interface subsystem 138 can receive the predictions 165 and can generate a user interface presentation based on the predictions 165, e.g., an alert for an operator of the vehicle 122 that the vehicle's speed exceeds the requirements of the traffic sign or a user interface presentation having image or video data containing a representation of the region of space that is occupied by another vehicle. An on-board display device can then display the user interface presentation for view by passengers of the vehicle 122.

The on-board classifier subsystem 134 can also use the sensor data 155 to generate log data 127 that is transmitted to the training system 110, e.g., for use in training various machine learning models to make predictions. The on-board system 120 can provide the log data 127 to the training system 110 in offline batches or in an online fashion, e.g., continually whenever it is generated.

The log data 127 includes sensor data samples that were generated during operation of the vehicle 122.

The training system 110 is typically hosted within a data center 112, which can be a distributed computing system having hundreds or thousands of computers in one or more locations.

When the training system 110 receives log data 127 from a vehicle, the training system 100 stores the log data 127 in a sensor data repository 125. Generally, the sensor data repository 125 stores sensor data received from a large number of vehicles, i.e., the sensor data repository 125 stores sensor samples generated from sensor data captured during the operation of a large number of different vehicles. In some cases, the sensor data repository 125 can also include sensor data generated in simulation, i.e., generated as simulated versions of vehicles navigate through a software simulation of a real-world environment.

The training system 110 includes a training subsystem 114 that trains various machine learning models to make predictions using training data generated from the sensor samples in the sensor data repository 125.

For example, the training system 110 can use the sensor samples stored in the sensor data repository 125 to generate training data that includes training examples 123 for training a machine learning model. Each training example 123 includes (i) data from a sensor sample and (ii) a label that indicates some ground truth output that should be generated by the machine learning model for the sensor sample. The training subsystem 114 can then train a machine learning model on the training data to determine trained values of the weights of the machine learning model. After training is complete, the training system 110 can provide a final set of model weight values to the on-board system 120 for use in making predictions 165 for fully autonomous or semi-autonomous driving decisions. The training system 110 can provide the final set of model weight values by a wired or wireless connection to the on-board system 120.

However, in some cases, it may be necessary to search the sensor data repository 125 for relevant sensor samples. To allow for searching the repository 125, the training system 110 includes a sensor sample search engine 190.

To allow the sensor sample search engine 190 to more efficiently search the sensor data repository, the training system 110 implements one or more embedding neural networks 180, i.e., includes hardware that implements the operations of the layers of the embedding neural networks 180.

Each embedding neural network 180 is a neural network that has been trained to receive as input sensor data, i.e., a portion of or all of the data in a sensor sample, and to generate as output an embedding of the sensor data.

In some cases, the training system 110 implements a single embedding neural network 180.

In other cases, however, the training system 100 implements multiple embedding neural networks 180 that operate on different portions of the sensor sample, that generate embeddings that reflect different characteristics of the sensor sample, or both.

As on example, the embedding neural networks 180 may include one or more neural networks that generate embeddings by operating on image patches and one or more neural networks that operate on laser sensor data.

For example, the embedding neural networks 180 may include one or more deep convolutional neural networks that operates on image patches. In a particular example, the embedding neural network 180 may be a portion of an object classification neural network that has been trained to classify objects in the environment into different object categories. For example, the embedding neural network 180 may include all but one or more final layers of the trained object classification neural network. Thus, the embeddings generated by this embedding neural network 180 represent the type of object depicted in the sensor sample.

As another example, the embedding neural networks 180 may include one or more convolutional neural networks that operate on point cloud data generated by a laser sensor, e.g., a lidar sensor. Each of these convolutional neural networks can be the initial layers of a neural network that is trained to predict some type of annotation for the point cloud data, e.g., object type, object size, or object trajectory. An example of a convolutional neural network that operates on point cloud data is described in Yin Zhou et al, "End-to-End Multi-View Fusion for 3D Object Detection in LiDAR Point Clouds," available at https://arxiv.org/abs/1910.06528. Another example of such a convolutional neural network is described in, Y. Zhou and O. Tuzel. Voxelnet: End-to-end learning for point cloud based 3d object detection. In 2018 IEEE/CVF Conference on Computer Vision and Pattern Recognition, pages 4490-4499, June 2018.

When multiple ones of these neural networks that have been trained to predict different types of annotations are included in the set of embedding neural networks 180, the resulting set of embeddings for a given sensor sample includes multiple different embeddings that each reflect different characteristics of the sensor sample. In some cases, a single neural network can be trained to predict multiple different types of annotations for the same sensor sample. In these cases, the embedding generated by that neural network will reflect multiple different characteristics, e.g., color and object type or speed and heading.

Thus, generally, the embeddings generated by the various embedding neural networks 180 for a given sensor sample can each represent a certain property of the sample. An example set of properties includes one or more of: high-level object type, fine-grained object type, object speed, and object color of the sample. Accordingly, in one example, the set of embeddings for a sensor sample will include one embedding that represents a fine-grained object type and another that represents object speed.

When new sensor samples are received, the search engine 190 processes the new sensor samples using the embedding neural networks 180 to generate embeddings of each new sensor sample. The search engine 190 then stores data associating each sensor sample in the repository with the corresponding embeddings of the sensor sample.

When a request to search the repository is received, the search engine 190 generates query embeddings of the query sensor sample specified in the request using the embedding neural networks 180 and uses the query embeddings to search the embeddings in the repository, i.e., instead of directly searching the high-dimensional sensor samples.

In particular, the search engine 190 can maintain a search index that associates each sensor sample with the embeddings for the sensor sample.

In some implementations, the search engine 190 slices the index for each of the different types of embeddings. In other words, for a given type of embedding, i.e., for embeddings generated by a given embedding neural network 180, the search engine 190 generates multiple slices of embeddings, with each embedding of that type belonging to exactly one of the generated slices.

In these implementations, to search the index for a given query embedding of a given type, the search engine 190 first identifies the slice of the embeddings of that type that matches the query embeddings, and then searches the embeddings within the slice.

As a particular example, the search engine 190 can slice the embeddings of a given embedding type into k slices using k-means clustering or other unsupervised clustering technique, with each of the k slices corresponding to one of the k clusters and each slice being represented by the "prototype" or mean for the corresponding cluster as generated by the clustering technique.

To identify the embeddings of the given type that are most similar to a given query embedding, the search engine 190 first identifies the slice that matches the query embedding by identifying the prototype that is closest to the query embedding. The search engine 190 can then search within the slice to identify the closest embeddings to the query embedding.

Figure 2:
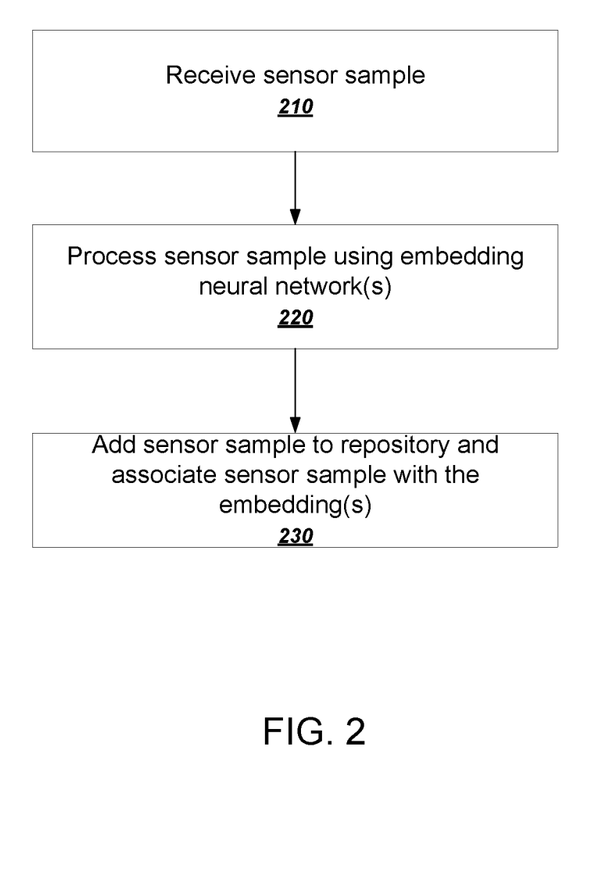
FIG. 2 is a flow chart of an example process for adding sensor samples to the repository.

FIG. 2 is a flow chart of an example process 200 for adding a sensor sample to a sensor data repository. The process will be described as being performed by an appropriately programmed computer system. For convenience, the process 200 will be described as being performed by a system of one or more computers located in one or more locations. For example, a training system, e.g., the training system 110 of FIG. 1, appropriately programmed in accordance with this specification, can perform the process 200.

The system receives a sensor sample generated from sensor data collected during operation of an autonomous vehicle (step 210).

The system processes the sensor sample using each of the one or more embedding neural networks to generate one or more embeddings of the sensor sample (step 220). As described above, when the set of embedding neural networks includes multiple neural networks, the different embeddings generally represent different properties or characteristics of the sensor sample.

The system adds the sensor sample to the repository and associates the sensor sample with the embeddings of the sensor sample (step 230). For example, the system can add an entry to the search index maintained by the system that associates the sensor sample with the embeddings for the sensor sample. In some cases, the system updates the slices of the index to account for the newly added embeddings.

Figure 3:
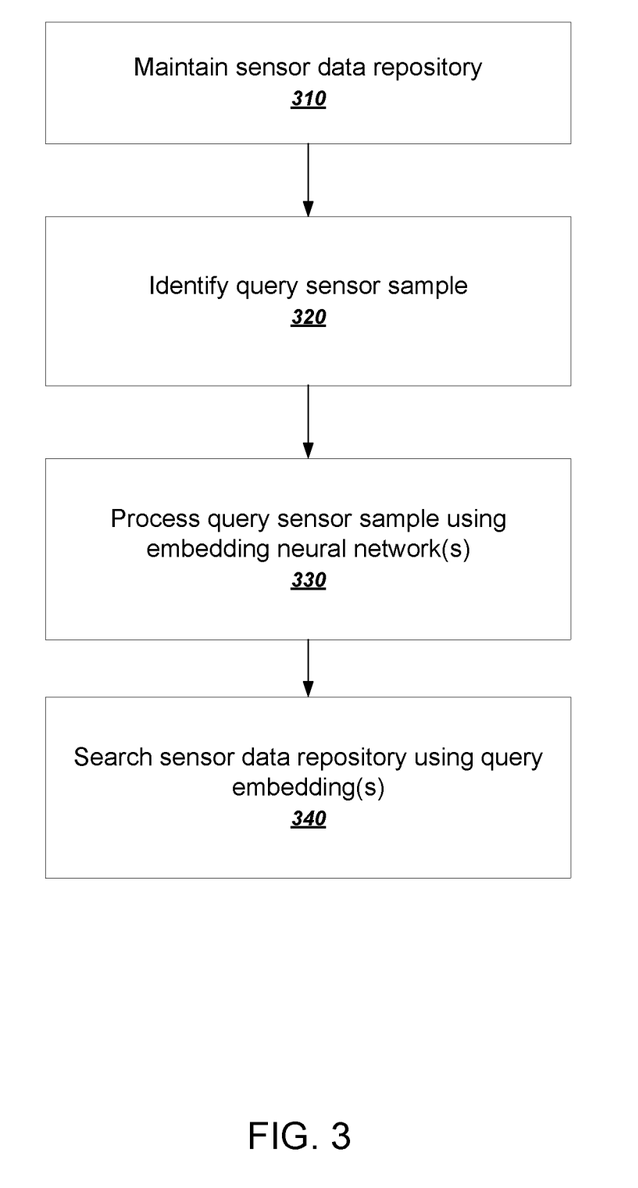
FIG. 3 is a flow chart of another example process for searching the repository.

FIG. 3 is a flow chart of an example process 300 for searching a repository storing a collection of sensor samples. The process will be described as being performed by an appropriately programmed computer system. For convenience, the process 300 will be described as being performed by a system of one or more computers located in one or more locations. For example, a training system, e.g., the training system 110 of FIG. 1, appropriately programmed in accordance with this specification, can perform the process 300.

The system maintains a sensor data repository (310). As described above, the sensor data repository includes a collection of sensor samples generated during the operation of autonomous vehicles, e.g., samples generated from sensor data collected by vehicles as the vehicles drive through environments.

Each sensor sample characterizes a particular region of an environment in the vicinity of an autonomous vehicle and includes data from one or more sensors of the autonomous vehicle.

For example, each sensor sample can include data that represents measurements from one or more of the sensors of an autonomous vehicle, with the measurements from each sensor characterizing the same region at the same time. As a particular example, the tensor can represent measurements from a camera sensor and one or more laser sensors of the autonomous vehicle. As another particular, example, the tensor can represent measurements from a camera sensor, a radar sensor, and a laser sensor.

For example, the sensor sample can include a patch of an image captured by the camera sensor of the region of the environment, point cloud data generated by one or more of the laser sensors, and, optionally, portions of one or more projections, e.g., a projection from a top-down view or a perspective view, of sensor data captured by one or more of the laser sensors that correspond to the region of the environment.

As described above, each sensor sample in the repository is also associated with one or more embeddings of the sensor sample. Each embedding of the sensor sample is an embedding generated by an embedding neural network by processing the sensor sample. More specifically, each embedding that is generated by a given embedding neural network is generated in accordance with the same, trained parameter values of the embedding neural network. That is, the system or another system trains each embedding neural network and then fixes the parameter values to the trained values.

The system identifies a query sensor sample that characterizes a region of interest (step 320). In particular, the system can receive a user input or other request specifying a region of interest in the environment and can identify or generate a sensor sample characterizing the region of interest. For example, the system can provide, for presentation in a user interface, an image of the environment surrounding a vehicle as generated by the camera sensor of the vehicle (or a visual representation of other sensor data captured by other sensors) and the user can submit an input specifying the region of the image that is of interest.

The system processes the query sensor sample using one or more embedding neural networks to generate one or more query embeddings of the query sensor sample (step 330). In some cases, the system processes the query sensor sample using each of the embedding neural networks in the set of embedding neural networks that are maintained by the system. In other cases, the user may specify a particular property that is of interest, and the system can process the sensor sample using only the embedding neural network(s) from the set that generate embeddings that reflect that property. As a particular example, if the query specifies that the property of interest is object type, the system may not process the sensor sample using an embedding neural network that generates embeddings that reflect object speed.

The system searches the sensor data repository using the query embeddings to identify relevant sensor samples (step 340).

In particular, for each of the query embeddings, the system can identify, from the embeddings in the sensor data repository that were generated by the same embedding neural network, a predetermined number of embeddings that are closest to the query embedding in the embedding space or can identify, from the embeddings in the sensor data repository, each embedding that is closer than a threshold distance to the query embedding in the embedding space. The system can then identify the sensor samples associated with the identified embeddings as relevant sensor samples.

The system can measure how close one embedding is to another embedding using a distance measure, i.e., a function that receives two embeddings as input and returns a score that represents how close the two embeddings are. Examples of distance measures that can be used include cosine similarity and Euclidean distance.

When the index is sliced, for each query embedding, the system can first identify the slice that the query embedding belongs to, and then search within the slice as described above to determine the closest embeddings. For example, the system can identify the slice that the query embedding belongs to by identifying the closest prototype to the query embedding.

By first identifying the slice and only performing the search for the closest embedding within the identified slice, the system can reduce the latency and amount of computational resources necessary to identify the closest embeddings even when the number of sensor samples stored in the repository is very large.

In some implementations, when there are multiple query embeddings, the system separately identifies the relevant sensor samples for each query embedding, i.e., for each of the desired properties or characteristics. For example, the system can identify relevant sensor samples for each query embedding as described above and can then associate each relevant sensor sample with the property or properties reflected by the query embedding used to identify the sensor sample.

In some other implementations, when there are multiple query embeddings, the system joins the result set so that only sensor samples that have embeddings that are relevant to all of the query embeddings are returned. Thus, only sensor samples that match the query sensor sample along all of the desired properties or characteristics are returned.

In some implementations, the system leverages labels associated with sensor samples in the repository in identifying relevant sensor samples. For example, the sensor samples in the collection of sensor samples can each associated be associated with a high-level classification that identifies an object type of an object located in the environment region characterized by the sensor sample, e.g., vehicle, pedestrian, road sign, or so on. In these cases, the request may specify a query high-level classification. For example, the query sensor sample may characterize a type of road sign that a user is unfamiliar with and the user may wish to surface other instances when an autonomous vehicle encountered a similar road sign. The system can then search only the sensor samples in the collection that are associated with the same query high-level classification, e.g., by discarding any identified relevant sensor samples that do not have a high-level classification that matches the query high-level classification.

Once the relevant sensor samples have been identified, the system can use the relevant sensor samples in any of a variety of ways.

For example, when the region of interest characterizes an object of a particular class, the system can use the relevant sensor samples to generate training data for training a machine learning model to classify whether or not input sensor samples characterize objects belonging to the particular class. This can be useful, for example, when it is discovered that the autonomous vehicles would benefit from being able to accurately classify objects of a particular class, but an insufficient number of samples are labeled as depicting objects belonging to that particular class.

As another example, when the region of interest is a region where an event of interest is occurring, the system can generate, for each of the identified sensor samples, a visual representation of the sensor sample, and optionally, other sensor samples captured within a particular time window of the sensor sample and provide the visual representation for presentation on a user device. As a particular example, the system can, for each relevant sensor sample, identify other sensor samples that were captured within a specified time window of the relevant sensor sample and generate a video representation of the other sensor samples and the relevant sensor sample, e.g., a video showing the camera image patches from the other sensor samples and the relevant sensor samples arranged in chronological order.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method, the method comprising:
   maintaining a collection of sensor samples and, for each sensor sample, one or more embeddings of the sensor sample, wherein:
   each sensor sample in the collection is generated from sensor data captured by a corresponding vehicle and characterizes an environment region in a vicinity of the corresponding vehicle, and
   each embedding has been generated by processing data from the corresponding sensor sample through an embedding neural network;
   receiving a request specifying a query sensor sample, wherein the query sensor sample characterizes a query environment region which has been identified as depicting an object belonging to a particular class;

identifying, from the collection of sensor samples, a plurality of relevant sensor samples that characterize similar environment regions to the query environment region, comprising:
processing the query sensor sample through the embedding neural networks to generate a query embedding; and
identifying, from sensor samples in a subset of the sensor samples in the collection, a plurality of sensor samples that have embeddings that are closest of the query embedding;
generating a plurality of training examples using the relevant sensor samples, wherein each training example comprises a respective relevant sensor sample that has been identified to characterize a similar environment region to the query environment region; and
using training data comprising the plurality of training examples to train a machine learning model configured to predict whether an input sensor sample characterizes objects belonging to the particular class.

2. The method of claim 1, further comprising:
processing each sensor sample in the collection using each embedding neural network in a set of embedding neural networks in the set to generate the embeddings of the sensor sample.

3. The method of claim 1, further comprising:
generating a visual representation for each of the plurality of relevant sensor samples; and
providing the visual representations for presentation on a user device.

4. The method of claim 3, wherein generating a visual representation for each of the plurality of relevant sensor samples comprises:
for each relevant sensor sample, identifying other sensor samples that were captured within a specified time window of the relevant sensor sample; and
generating a video representation of the other sensor samples and the relevant sensor sample.

5. The method of claim 1, wherein:
the sensor samples in the collection of sensor samples are each associated with a high-level classification that identifies an object type of an object located in the environment region characterized by the sensor sample;
the request specifies a query high-level classification; and
the subset includes only sensor samples in the collection that are associated with the query high-level classification.

6. The method of claim 1, wherein the embeddings of the sensor samples in the collection and the query embedding are each generated in accordance with trained values of parameters of the embedding neural networks.

7. The method of claim 1, wherein each sensor sample represents measurements from a plurality of sensors of the corresponding vehicle, with the measurements from each sensor characterizing the same region at the same time.

8. The method of claim 1, wherein the plurality of sensor samples that have embeddings that are closest to the query embedding are the sensor samples that are nearest to the query embedding according to a distance metric.

9. The method of claim 8, wherein the distance metric is Euclidian distance or cosine similarity.

10. One or more non-transitory computer-readable storage media storing instructions that when executed by one or more computers cause the one or more computers to perform respective operations comprising:
maintaining a collection of sensor samples and, for each sensor sample, one or more embeddings of the sensor sample, wherein:
each sensor sample in the collection is generated from sensor data captured by a corresponding vehicle and characterizes an environment region in a vicinity of the corresponding vehicle, and
each embedding has been generated by processing data from the corresponding sensor sample through an embedding neural network;
receiving a request specifying a query sensor sample, wherein the query sensor sample characterizes a query environment region which has been identified as depicting an object belonging to a particular class;
identifying, from the collection of sensor samples, a plurality of relevant sensor samples that characterize similar environment regions to the query environment region, comprising:
processing the query sensor sample through the embedding neural network to generate one or more query embeddings; and
identifying, from sensor samples in a subset of the sensor samples in the collection, a plurality of sensor samples that have embeddings that are closest to the query embedding;
generating a plurality of training examples using the relevant sensor samples, wherein each training example comprises a respective relevant sensor sample that has been identified to characterize a similar environment region to the query environment region; and
using training data comprising the plurality of training examples to train a machine learning model configured to predict whether an input sensor sample characterizes objects belonging to the particular class.

11. A system comprising one or more computers and one or more storage devices storing instructions that when executed by one or more computers cause the one or more computers to perform operations comprising:
maintaining a collection of sensor samples and, for each sensor sample, one or more embeddings of the sensor sample, wherein:
each sensor sample in the collection is generated from sensor data captured by a corresponding vehicle and characterizes an environment region in a vicinity of the corresponding vehicle, and
each embedding has been generated by processing data from the corresponding sensor sample through an embedding neural network;
receiving a request specifying a query sensor sample, wherein the query sensor sample characterizes a query environment region which has been identified as depicting an object belonging to a particular class;
identifying, from the collection of sensor samples, a plurality of relevant sensor samples that characterize similar environment regions to the query environment region, comprising:
processing the query sensor sample through one or more of the embedding neural network to generate one or more query embeddings; and
identifying, from sensor samples in a subset of the sensor samples in the collection, a plurality of sensor samples that have embeddings that are closest to the query embedding;
generating a plurality of training examples using the relevant sensor samples, wherein each training example comprises a respective relevant sensor sample that has been identified to characterize a similar environment region to the query environment region; and using training data comprising the plurality of training examples data to train a machine learning model configured to predict whether an input sensor sample characterizes objects belonging to the particular class.

12. The system of claim 11, the operations further comprising:

processing each sensor sample in the collection using the embedding neural networks to generate the embeddings of the sensor sample.

13. The system of claim 11, the operations further comprising:

generating a visual representation for each of the plurality of relevant sensor samples; and providing the visual representations for presentation on a user device.

14. The system of claim 11, wherein:

the sensor samples in the collection of sensor samples are each associated with a high-level classification that identifies an object type of an object located in the environment region characterized by the sensor sample;

the request specifies a query high-level classification; and the subset includes only sensor samples in the collection that are associated with the query high-level classification.

15. The system of claim 11, wherein the embeddings of the sensor samples in the collection and the query embedding are each generated in accordance with trained values of parameters of the embedding neural networks.

16. The system of claim 11, wherein each sensor sample represents measurements from a plurality of sensors of the corresponding vehicle, with the measurements from each sensor characterizing the same region at the same time.

17. The system of claim 11, wherein the plurality of sensor samples that have embeddings that are closest to the query embedding are the sensor samples that are nearest to the query embedding according to a distance metric.

* * * * *